United States Patent
Yeung et al.

(10) Patent No.: US 10,413,934 B2
(45) Date of Patent: Sep. 17, 2019

(54) METHODS OF REDUCING SINUOUS FLOW DURING MACHINING AND PRODUCTS FORMED THEREBY

(71) Applicant: Purdue Research Foundation, West Lafayette, IN (US)

(72) Inventors: Ho Yeung, Bethesda, MD (US); Koushik Viswanathan, Greenwood, IN (US); Walter Dale Compton, West Lafayette, IN (US); Srinivasan Chandrasekar, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 241 days.

(21) Appl. No.: 15/212,935

(22) Filed: Jul. 18, 2016

(65) Prior Publication Data

US 2017/0014862 A1    Jan. 19, 2017

Related U.S. Application Data

(60) Provisional application No. 62/194,082, filed on Jul. 17, 2015.

(51) Int. Cl.
| | |
|---|---|
| *B05D 3/00* | (2006.01) |
| *B23C 3/00* | (2006.01) |
| *B23B 25/02* | (2006.01) |
| *B23B 1/00* | (2006.01) |

(52) U.S. Cl.
CPC .......... *B05D 3/002* (2013.01); *B23B 1/00* (2013.01); *B23B 25/02* (2013.01); *B05D 2202/00* (2013.01); *B23B 2228/10* (2013.01); *B23B 2228/24* (2013.01); *B23B 2228/28* (2013.01)

(58) Field of Classification Search
None
See application file for complete search history.

(56) References Cited

U.S. PATENT DOCUMENTS

| | | | | |
|---|---|---|---|---|
| 3,757,735 | A * | 9/1973 | Crowe | B05C 9/08 118/50 |
| 2010/0062200 | A1* | 3/2010 | Domes | B05D 7/14 428/35.8 |

* cited by examiner

*Primary Examiner* — Jeffrey D Washville
(74) *Attorney, Agent, or Firm* — Hartman Global IP Law; Gary M. Hartman; Domenica N.S. Hartman

(57) ABSTRACT

Methods of machining a body to produce a chip are provided wherein the body is formed of a material and in a state such that the material exhibits sinuous flow during a machining operation. The methods include providing a layer located on a surface of the body, and machining the body by causing engagement between a cutting tool and the body in a contact region below an area of the surface having the coating layer thereon and moving the cutting tool relative to the body to produce the chip having the layer thereon. The layer reduces sinuous flow in the material of the body and the chip is formed primarily by laminar flow.

17 Claims, 13 Drawing Sheets

METHODS OF REDUCING SINUOUS FLOW DURING MACHINING AND PRODUCTS FORMED THEREBY

CROSS REFERENCE TO RELATED APPLICATIONS

This application claims the benefit of U.S. Provisional Application No. 62/194,082, filed Jul. 17, 2016, the contents of which are incorporated herein by reference.

STATEMENT REGARDING FEDERALLY SPONSORED RESEARCH

This invention was made with government support under CMMI1234961 and CMMI1363524 awarded by the National Science Foundation. The government has certain rights in the invention.

BACKGROUND OF THE INVENTION

The present invention generally relates to processes for machining materials. The invention particularly relates to systems and methods for improving the machinability of surfaces of relatively soft and/or ductile materials, such as but not limited to annealed metals and/or alloys.

A typical machining process involves removal of material from a body with a cutting tool. The portion of material removed from the body is commonly referred to as a chip, and under appropriate conditions may be in the form of a continuous chip. For example, FIG. 1 represents a cutting tool 12 in contact with and moving relative to a workpiece 14 to form and remove a portion 16 of the workpiece 14, referred to as a bulk material, to yield a chip 18. This example represents an ideal plane-strain machining process characterized by formation of the chip 18 by simple shear resulting in a smooth, laminar flow of the material.

It is well known that machining a non-brittle metal in a soft state, for example, after being annealed, is significantly more difficult than machining the same metal in a hardened state, for example, after undergoing strain hardening. When the workpiece being cut is a metal in a soft state, the machining process generally requires a relatively large cutting force and results in an unusually thick chip. This difficulty in cutting, well known in industrial practice, has hitherto eluded fundamental explanation. Conventionally, at the mesoscale (for example, about 100 µm up to about 5 mm), the structure of the chip has been assumed to be homogeneous, resulting from laminar plastic flow as represented in FIG. 1 (schematically represented by flow lines within the chip 18). Using such framework, augmented by ex situ observations, the high forces have generally been attributed to the thick chip developed in the process, without an explanation of the cause of such anomalous chip formation.

In view of the above, it can be appreciated that it would be desirable if methods were available for machining relatively soft and/or ductile materials with reduced cutting forces and thinner resulting chips.

BRIEF DESCRIPTION OF THE INVENTION

The present invention provides methods capable of producing chips by laminar flow in materials in which sinuous flow may otherwise occur during machining.

According to one aspect of the invention, a method of machining a body to controllably produce a chip wherein the body is formed of a material and in a state such that the material exhibits sinuous flow during a machining operation is provided that includes providing a layer located on a surface of the body, and machining the body by causing engagement between a cutting tool and the body in a contact region below an area of the surface having the coating layer thereon and moving the cutting tool relative to the body to produce the chip having the layer thereon. The layer reduces sinuous flow in the material of the body and the chip is formed primarily by laminar flow.

Other aspects of the invention include the chip produced/formed by the method described above.

Technical effects of the method described above preferably include the capability of machining materials in a softened state to produce chips via laminar flow rather than sinuous flow inherent in certain materials, preferably resulting in reduced cutting forces and thinner chips.

Other aspects and advantages of this invention will be better appreciated from the following detailed description.

DETAILED DESCRIPTION OF THE INVENTION

Figure 1:
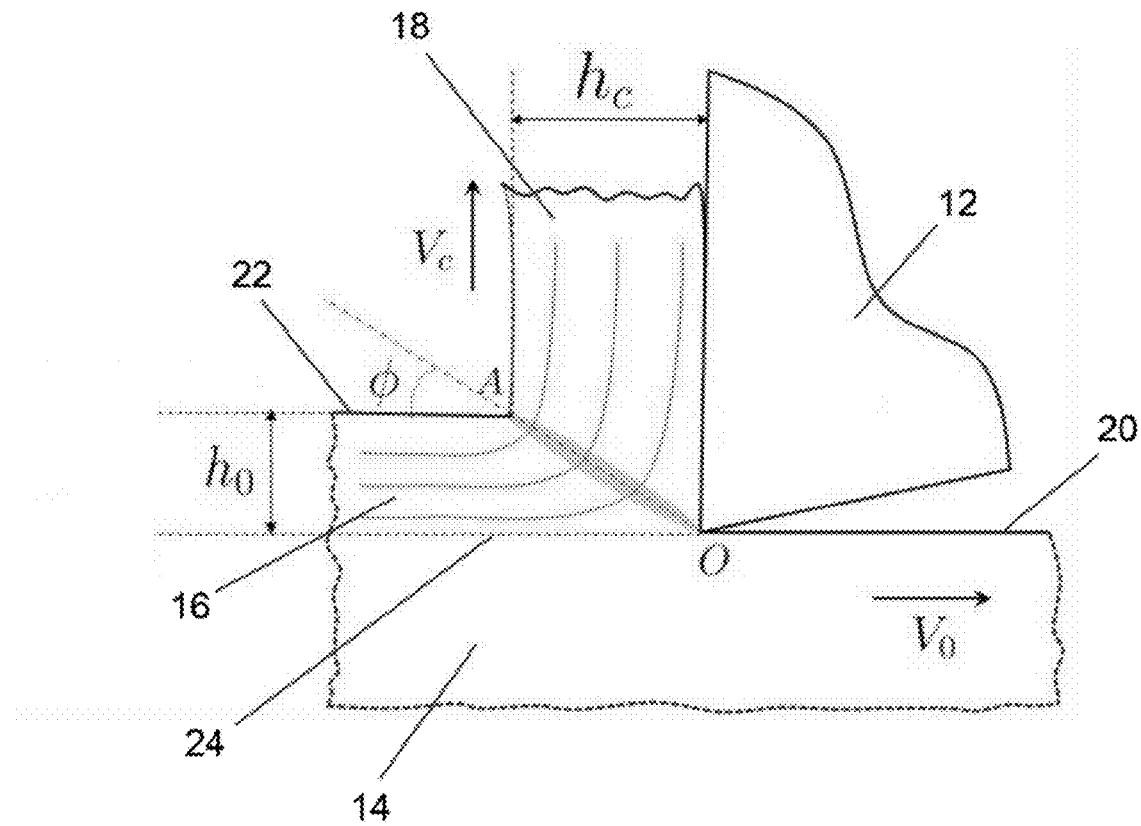
FIG. 1 is a schematic representation of plane-strain cutting showing chip formation by smooth laminar flow with simple shear.

The following discussion is directed to processes and systems by which relatively soft and/or ductile metals and alloys, such as annealed metals, or other ductile materials can be machined with reduced cutting force and to yield a relatively thin chip, and the products made thereby. The machining process represented in FIG. 1 represents a plane-strain machining process involving a cutting tool 12 in contact with and being moved relative to a workpiece 14 in order to cause plastic (irreversible) shape transformation in and remove an upper portion 16 of the workpiece 14 to form a chip 18. The process is schematically represented in FIG. 1 as characterized by formation of the chip 18 by simple shear resulting in a smooth, laminar flow of material in the upper portion 16 of the workpiece 14. For convenience, processes, systems, and products disclosed below will be described in reference to the machining process and orientation represented in FIG. 1. However, it should be understood that the processes and systems of this disclosure are applicable to a variety of machining processes such as but not limited to cutting, turning, and boring processes, as well as other types of metal processes such as forming and surface conditioning processes. For convenience, consistent reference numbers are used throughout the drawings to identify the same or functionally equivalent elements.

Referring to FIG. 1, a deformation zone is indicated between points A and O, $h_0$ is an initial thickness of the upper portion 16 of the workpiece (bulk material) 14 that is to be removed by the machining process, $h_c$ is the thickness of the resulting chip 18, and $V_0$ is the bulk material flow velocity. The arrow adjacent $V_0$ indicates the direction of relative travel between the cutting tool 12 and the workpiece 14. As represented, $h_0$ is measured from an outermost surface 22 of the workpiece 14 (referred to herein as the free surface) to a material separation surface 24, that is, the depth of the upper layer 16 to be removed to yield a final surface 20 of the resulting machined workpiece 14. During the machining process, the workpiece 14 undergoes plastic shape transformation to form the chip 18 with the thickness $h_c$. The face of the cutting tool 12 is in contact with the material in the deformation zone and is represented as being fixed at normal (90°) to the cutting direction.

Though conventional wisdom has been that the structure of the chip 18 is homogeneous and results from laminar plastic flow (schematically represented by flow lines within the chip 18), investigations leading to the present invention determined that relatively soft and/or ductile metals, particularly annealed metals and/or alloys having a microstructure characterized by relatively large grains, do not exhibit laminar plastic flow during machining as conventionally assumed. Instead, these metals exhibit a mesoscopic deformation mode referred to herein as "sinuous flow," a mode of deformation in the same genre as kinking and shear banding.

Figure 2:
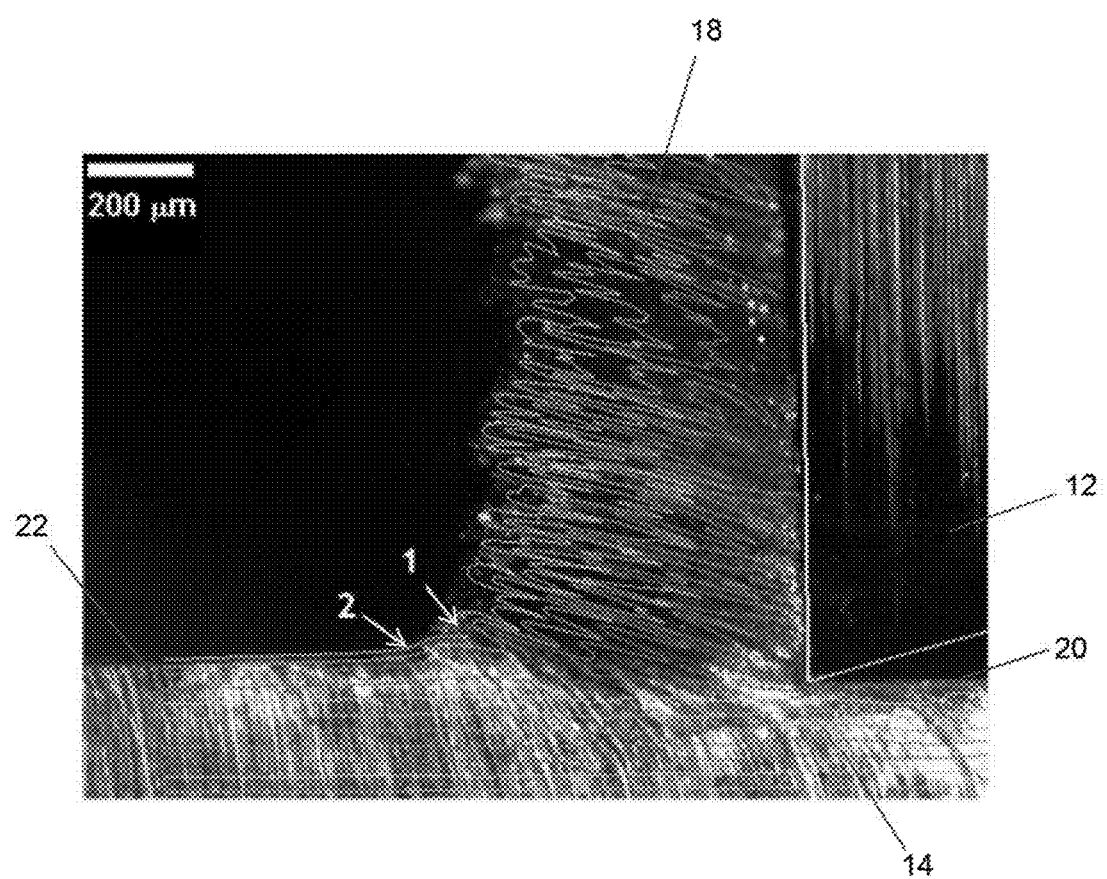
FIG. 2 is an image showing a sinuous flow mode of deformation in an annealed copper workpiece during a machining operation.
Figure 3:
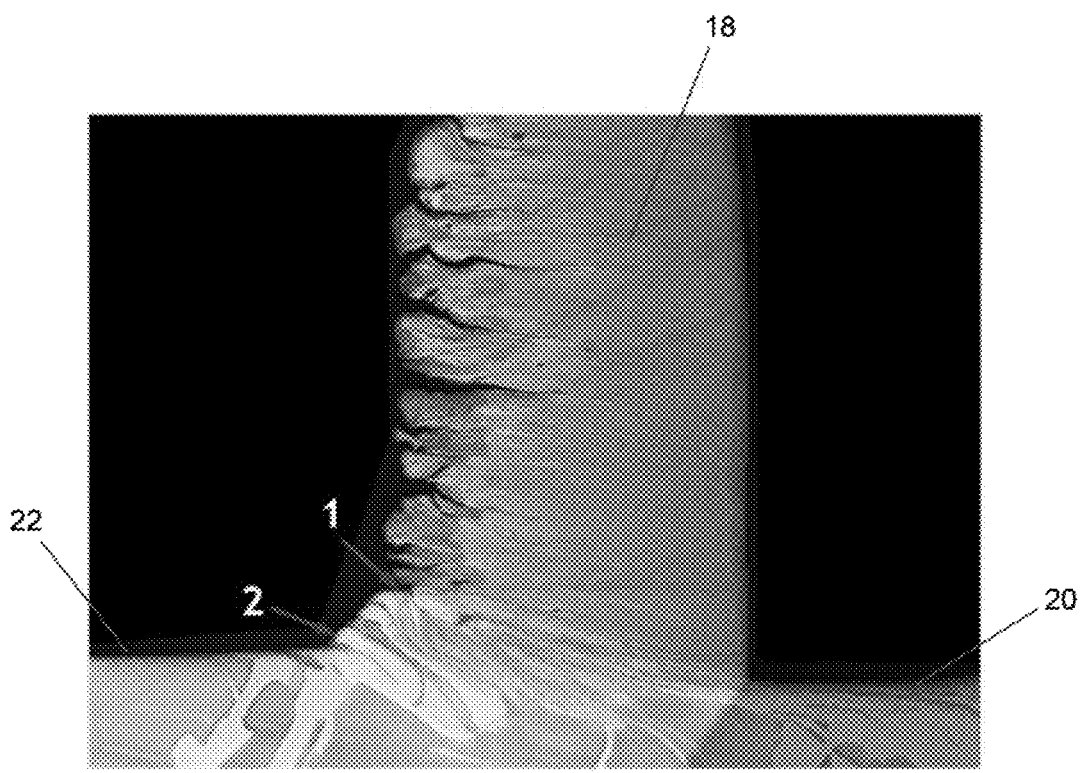
FIG. 3 is an image of an optical micrograph showing the chip of FIG. 2.
Figure 4:
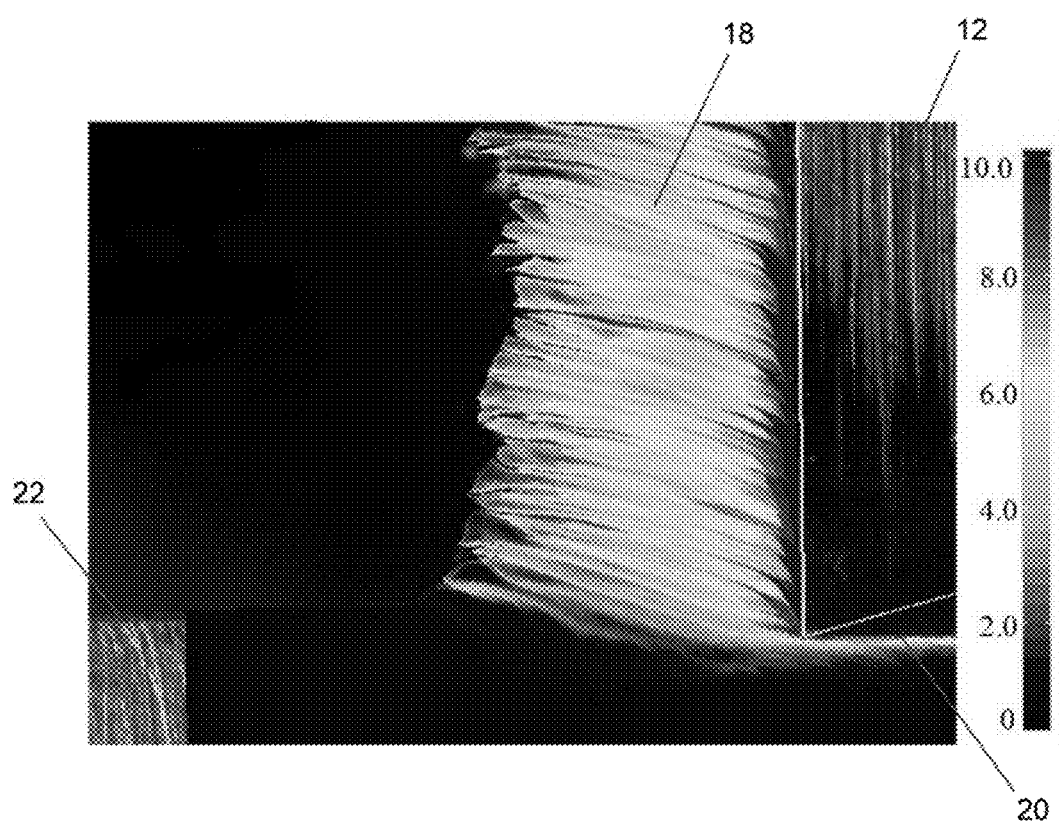
FIG. 4 is an image representing strain distribution in the chip of FIG. 2, with mean $<\varepsilon>=5.62$. The highly inhomogeneous strain distribution inside the chip is reflective of multiple folds during deformation.

FIGS. 2 through 4 contain images that depict sinuous flow in a workpiece 14 during a machining operation of a type carried out in various natural and industrial machining processes. The workpiece 14 was an annealed, oxygen-free (99.99%), high conductivity (OFHC) copper sample having an average grain size of about 500 μm. The workpiece 14 was annealed in air at 750° C. for four hours and oven cooled to room temperature. The machining process was performed as described above in relation to FIG. 1. The cutting tool 12 was a hard steel wedge that traveled at a velocity of $V_0$=0.42 mm/s, and the cutting depth was maintained at $h_0$=50 μm. During the machining operation, the flow of the material against the face of the cutting tool 12 was observed in situ and photographed using a high-speed camera. The images were post-processed using Particle Image Velocimetry (PIV) to obtain a comprehensive record of velocity, strain rate, and strain field histories. This enabled quantitative characterization of material flow past the edge of the cutting tool 12.

FIG. 2 is an image derived from a high speed image sequence that shows streaklines that represent a highly unsteady flow with significant vorticity. The streaklines are extensively folded over in the chip 18, with peak-to-peak amplitudes in a single fold being as much as two-thirds of the chip thickness ($h_c$ in FIG. 1). Small surface protuberances or bumps, which formed in the compressive field just ahead of the face of the cutting tool 12, were concluded to have triggered the folding. One such bump is represented as being bounded by two arrows (1 and 2) in FIG. 2. These arrows demarcate pinning points which were central to fold growth. The entire chip 18 thus formed by repeated folding of the incoming material, that is, sinuous flow, which bore little resemblance to any flow reported in classical plasticity.

The occurrence of sinuous flow cannot easily be inferred purely from post-mortem structural observations in the chip 18 or force measurements. As an illustration, an optical micrograph of the removed chip 18 is shown in FIG. 3. The surface of the chip 18 (left side) shows repeated mushroom-like formations with gaps in between. This structure has previously been described in literature as resulting from homogeneous flow, supplemented by cracking on the chip free surface. In situ analysis in investigations leading to the present invention revealed that the strain field in the chip 18 was actually highly nonhomogeneous, as seen in FIG. 4. FIG. 4 is an image representing strain distribution in the chip 18 of FIG. 2, with mean strain <ε>=5.62. The highly inhomogeneous strain distribution inside the chip 18 is reflective of multiple folds during deformation. As such, FIG. 4 indicated that the previous belief that the structure seen in FIG. 3 resulted from homogeneous flow was erroneous.

Figure 5:
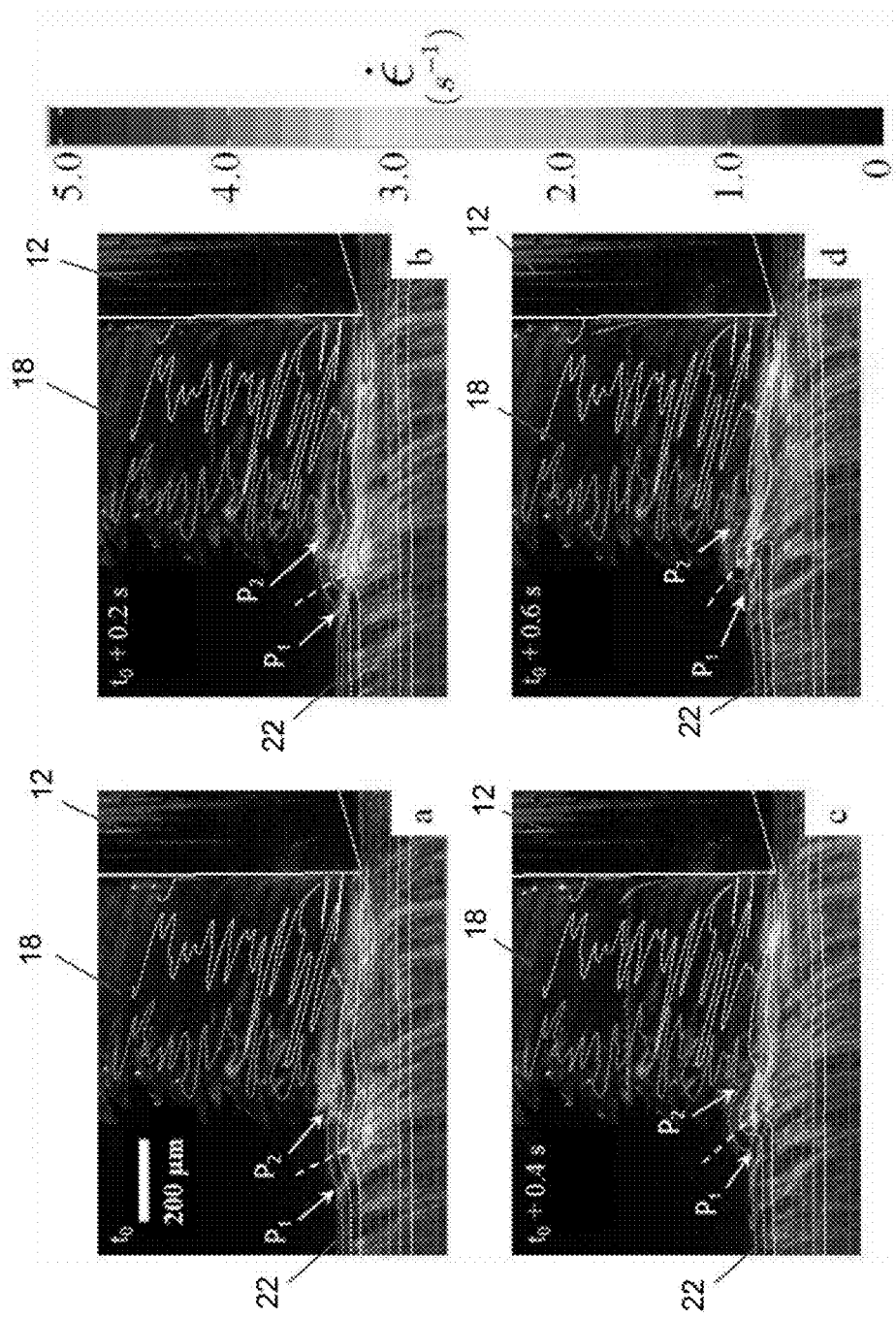
FIG. 5 is a sequence of images (a, b, c, and d) with superimposed streaklines showing the development of folds during deformation in an annealed copper workpiece.

FIG. 5 includes four frames (images a, b, c, and d) that represent the evolution of a bump into a fold over time. Two labeled points $P_1$ and $P_2$, bounding the initial bump, moved along with the material during the machining process as apparent from inspection of subsequent frames. A white dotted line representative of an axis of the bump is shown as indicating the orientation of the impending fold. The shading of the streaklines depicts the underlying strain rate field obtained from PIV calculations.

In image (a) of FIG. 5, $P_1$ and $P_2$, corresponding to grain boundaries, delimited the initial bump and appeared to act as local pinning points, forcing the bump to deform plastically and resulting in a pronounced bulge on the free surface 22 in image (b). The underlying strain rate field reflected this deformation in the two local zones surrounding the initial bump (images a and b). The bump axis was nearly parallel in both frames. Simultaneous with surface bulging, the material of the workpiece 14 was also constantly forced against the vertical face of the cutting tool 12. This constraint imparted a vertical velocity to each point in the material. The bulge in image (b) was hence sheared, causing the axis to rotate in a counter-clockwise direction as represented in image (c). The magnitude of shear increased as the material neared the face of the cutting tool 12. The bulge was amplified while also reducing its original width (image d), with the material between $P_1$ and $P_2$ constituting a single impending fold. Folding was complete once the original bump axis was rotated by nearly 90°, at which time another bulge was initiated ahead of the face of the cutting tool 12 and the process repeated.

Figure 6:
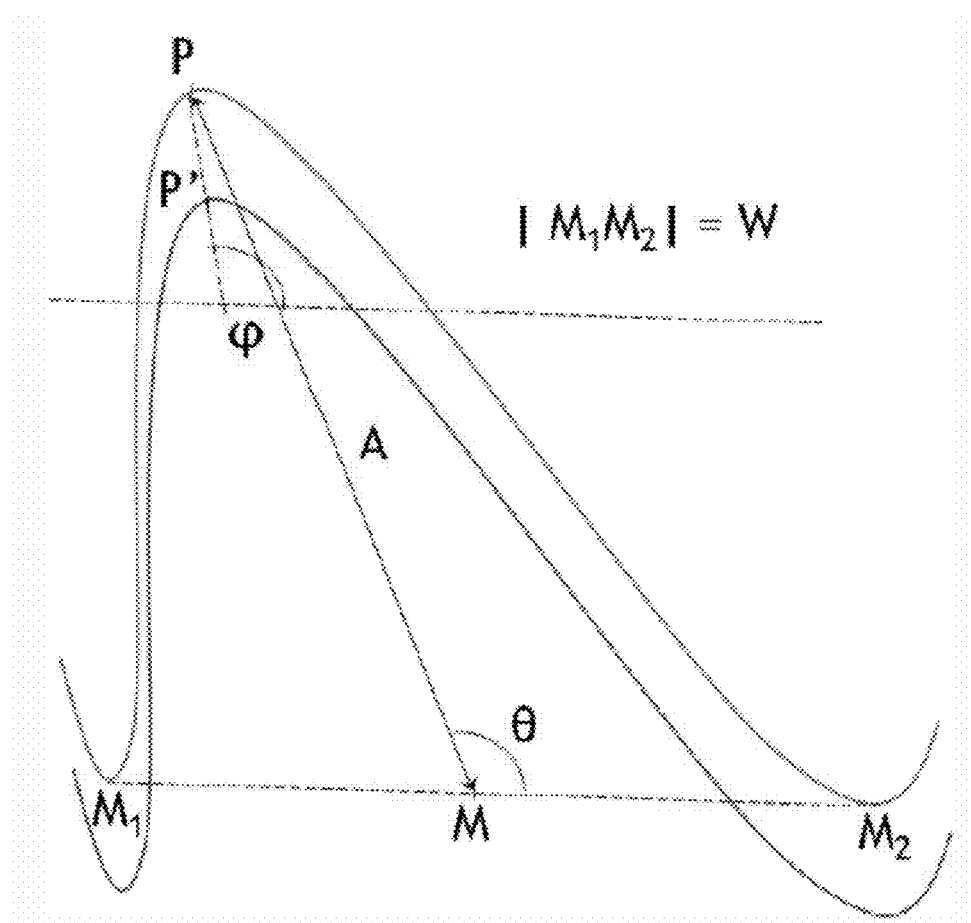
FIG. 6 represents two adjacent streaklines demarcating a single fold formed during deformation of an annealed copper workpiece. P is the fold peak (curve maximum), $M_1$ and $M_2$ are fold troughs (curve minima), M is the midpoint of line $M_1M_2$, P' is the maximum of the second streakline, and the axial line $PP_0$ and the line PM subtend angles $\varphi$ and $\theta$ with $M_1$-$M_2$. The fold amplitude A and width W are the lengths of lines PM and $M_1M_2$, respectively.
Figure 7:
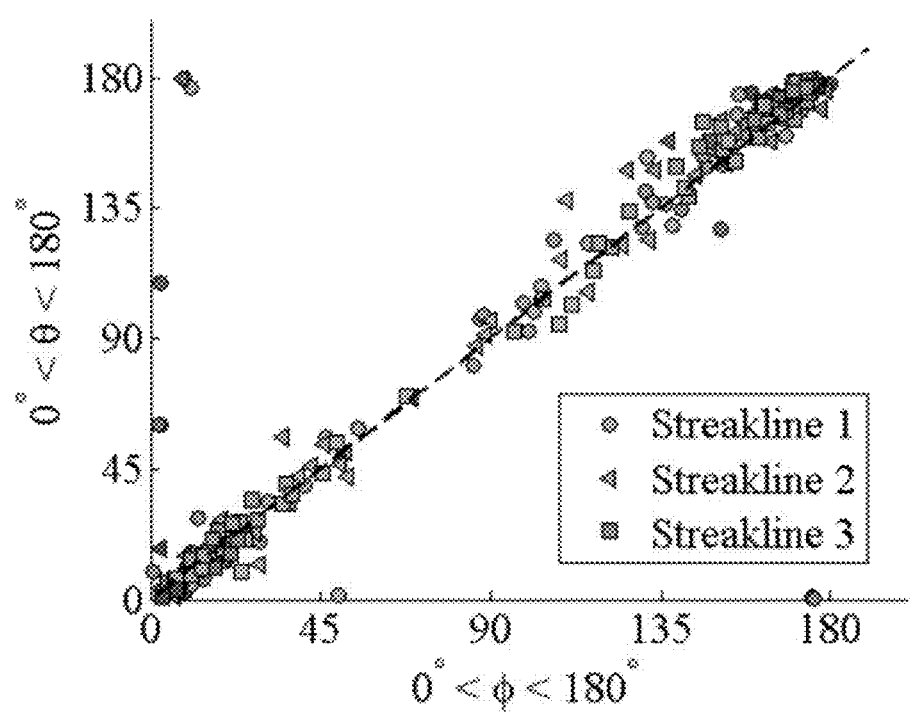
FIG. 7 is a scatter plot of $\varphi$ and $\theta$ representing the first (circle), second (triangle), and third (square) streaklines from the free surface. The values fall around the 45° line, deviation from which implies non-uniform streakline spacing. Marker color indicates fold width (W), where darker color indicates a large fold and lighter color indicates a small fold. All of the wide folds underwent large shear and the smaller ones remained upright ($\varphi$ and $\theta$ were about 90°).

It can be seen that the chip 18 comprised a series of folds, developed one after another in the manner described above. Corresponding folds in the streakline pattern provided quantitative geometric fold characteristics as well as variations along the chip thickness $h_c$. The results of this analysis are summarized in FIGS. 6 through 8. FIG. 6 represents two adjacent streaklines demarcating a single fold formed during deformation of an annealed copper workpiece 14. P is the fold peak (curve maximum), $M_1$ and $M_2$ are fold troughs (curve minima), M is the midpoint of line $M_1M_2$, P' is the maximum of the second streakline, and the axial line $PP_0$ and the line PM subtend angles $\varphi$ and $\theta$ with $M_1M_2$. The fold amplitude A and width W are the lengths of lines PM and $M_1M_2$, respectively. FIG. 7 is a plot of $\theta$ vs. $\varphi$ representing inhomogeneous shear in the material.

Figure 8:
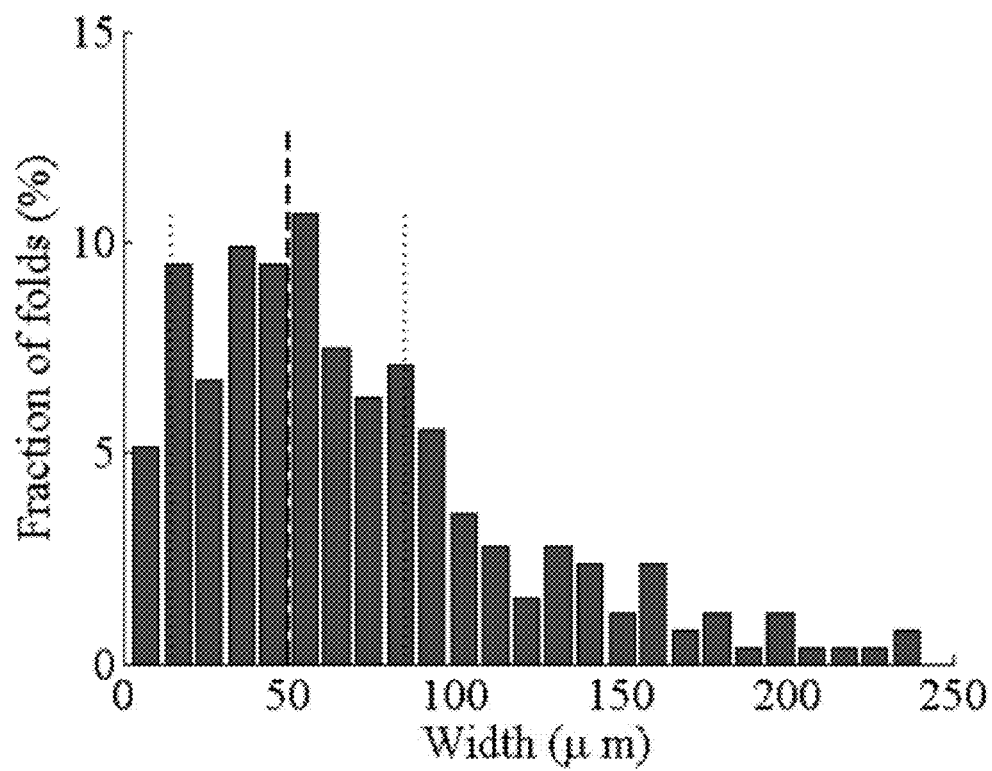
FIG. 8 is a histogram of fold widths. The mean width (Wm) is represented with a dashed line at about 50 µm and one standard deviation is represented with dotted lines. The mean wavelength of the folds was about 200 µm at the point of formation.

For symmetrically sheared folds, the maxima of adjacent streaklines were expected to lie on a line PM in FIG. 6 which corresponds to a 45° dashed line in FIG. 7. However, local shear resulted in a varying distance between adjacent streaklines, as indicated in FIG. 6. Additionally, both $\varphi$ and $\theta$ values were clustered near 0° and 180°, which indicate a large shear. Geometrically, this brought fold peaks P closer to the extrapolated minima line $M_1M_2$. Most wide folds underwent large shear, while a minor fraction (small folds) remained upright ($\varphi$ and $\theta$ about 90°) and formed over existing larger folds. The distribution for width W, including the mean width Wm of about 50 µm and one standard deviation, is shown in FIG. 8. The wider folds (Wm≥150 µm) occurred near the beginning of the streaklines, getting progressively narrower as material flowed past the cutting tool. Subsequently, the small folds, constituting 10% of the total, were developed. The mean and maximum fold widths were smaller than the initial grain size in the material (about 500 µm). The average fold wavelength was about 200 µm at the point of formation.

One consequence of this sinuous flow mechanism was that the resulting chip 18 was relatively thick, having a final thickness ($h_c$) of about fourteen times the initial thickness ($h_0$) as seen in the images of FIG. 5. However, this significant thickening was not a priori indicative of the actual unsteady folding phenomenon, for such a shape change can also be envisaged in the framework of ideal smooth laminar flow (FIG. 1). Characteristically, however, the sinuous flow also produced a highly non-uniform strain field in the chip 18, fluctuating between 4 and 8, that reflects the underlying fold pattern (FIG. 4). The representative (volume-weighted) strain for sinuous flow was about 5.6 which was much lower than for an equivalent shape change by laminar flow, corresponding to a strain of about 8.1.

Figure 11:
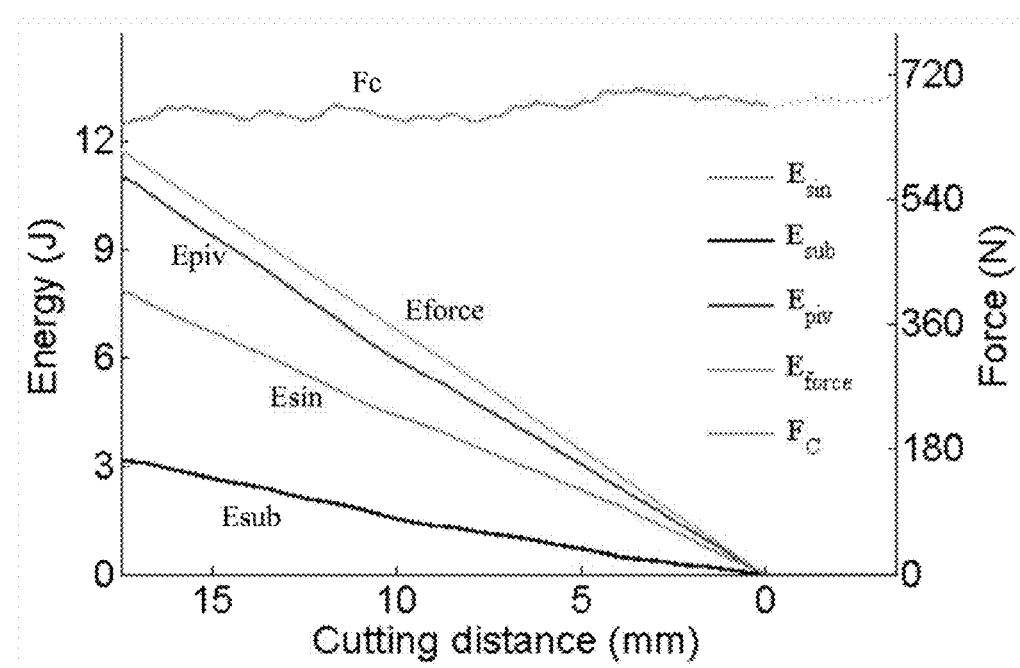
FIG. 11 shows a plot of energies and cutting force versus cutting distance obtained during a machining operation performed on an annealed copper workpiece. The cutting energy was computed from force ($E_{force}$) measurements and PIV ($E_{piv}$) analysis. $E_{piv}=E_{sin}+E_{sub}$ was obtained by integrating the stress along pathlines in the PIV flow field. $E_{sin}$ and $E_{sub}$ were the energies dissipated in the chip and the subsurface, respectively. The specific energy for sinuous flow ($U_{sin}$) was $E_{sin}$ per unit volume. The cutting force $F_c$ is also shown.

Similar to strain, the specific energy U (energy per unit volume) for chip formation, that is, shape transformation, was also significantly smaller for the sinuous flow. By the usual integration of stress and strain along path lines in the sinuous flow field, the specific energy for sinuous flow $U_{sin}$ was obtained as 2.9 J/mm³ (FIG. 11). In comparison, the corresponding value for an equivalent laminar flow (with $\varepsilon \cong 8.1$) was $U_{lam}$=4.2 J/mm³, which was 45% greater than $U_{sin}$. Based on the strain and specific energy, the shape transformation into a chip 18 was thus much more efficiently achieved by sinuous flow than by laminar flow. This is counterintuitive since, at first sight, the highly-folded, sinuous flow appears quite inefficient, involving extensive redundant deformation. But since selection of collective deformation modes is in general governed by their relative stability, the material's preference for sinuous flow is likely a result of a flow instability in smooth laminar flow.

To confirm the above observations, additional investigations were performed on relatively soft and/or ductile materials other than copper, including a-brass and commercially pure aluminum. Chip formation for these materials was also by sinuous flow indicating that it is a truly mesoscopic mode, independent of the material's crystal structure. Those skilled in the art will appreciate that sinuous flow should not be confused with the transition between laminar and rotational dislocation motion, which occurs at a much smaller scale.

The discovery of sinuous flow appears to explain the long-standing problem in machining relatively soft and/or ductile metals and/or alloys. In particular, the mechanism of fold formation during sinuous flow is strongly tied in with the large grain size and ductility common to annealed metals and is driven primarily by the ability of the material to undergo large plastic deformation. Microscopically, each grain roughly constitutes a single fold, consistent with both the formation mechanism (FIG. 5) and the fold width distributions (FIG. 8).

Sinuous flow also provides an explanation of the Rehbinder effect, which is a documented phenomenon relating to a small reduction (less than 10%) of the cutting forces required to machine a workpiece upon application of a suitable volatile fluid (for example, $CCl_4$) on the free surface of the workpiece. This effect was described in the publication, "P. Rehbinder, "New physico-chemical phenomena in the deformation and mechanical treatment of solids," Nature, 159:866-867 (1947), incorporated herein by reference in its entirety. The effect has traditionally been attributed to either microcracks on the free surface promoting a physico-chemical effect or a fundamental change in the dislocation structure near the surface of the workpiece. Besides the speculative nature of these explanations, the reports of the cutting force reductions have been inconsistent. However, sinuous flow provides an explanation for this effect, in that potentially any surface application, including volatile $CCl_4$, may modify the surface mechanical state of a workpiece to some extent and inhibit initial bump formation ahead of a cutting tool. Consequently, folding may be diminished, resulting in lower necessary cutting forces. The inconsistent force reductions previously observed may be due to a large variability in the initial state (annealed, partially/fully-hardened) of the workpiece arising from the specific preparation procedures.

In view of the above-noted investigations, it was concluded that the difficulty in machining annealed metals and/or alloys may be resolved if sinuous flow could be suppressed, reduced, or eliminated altogether, for example, by modifying the surface characteristics to overcome the effects of the large grain size and ductility of the annealed metals. Therefore, the following describes methods of machining workpieces formed of soft and/or ductile metals and/or alloys and other relatively soft and/or ductile materials, by which sinuous flow was shown to be suppressed or eliminated through the use of surface treatments and/or applications of coatings to their free surface prior to the machining operation. Such surface treatments and/or coatings are intended to modify the surface properties of the workpiece such that the resulting chips are formed by laminar flow, rather than sinuous flow. The inventors are not aware of any research into the Rehbinder effect that suggested modification of the free surface of the workpiece via pre-straining or adherence of coating layers. Rather, it is believed that the research was limited to volatile fluids that did not adhere to the free surface of the workpiece and instead tended to volatilize during the machining operation.

Figure 12:
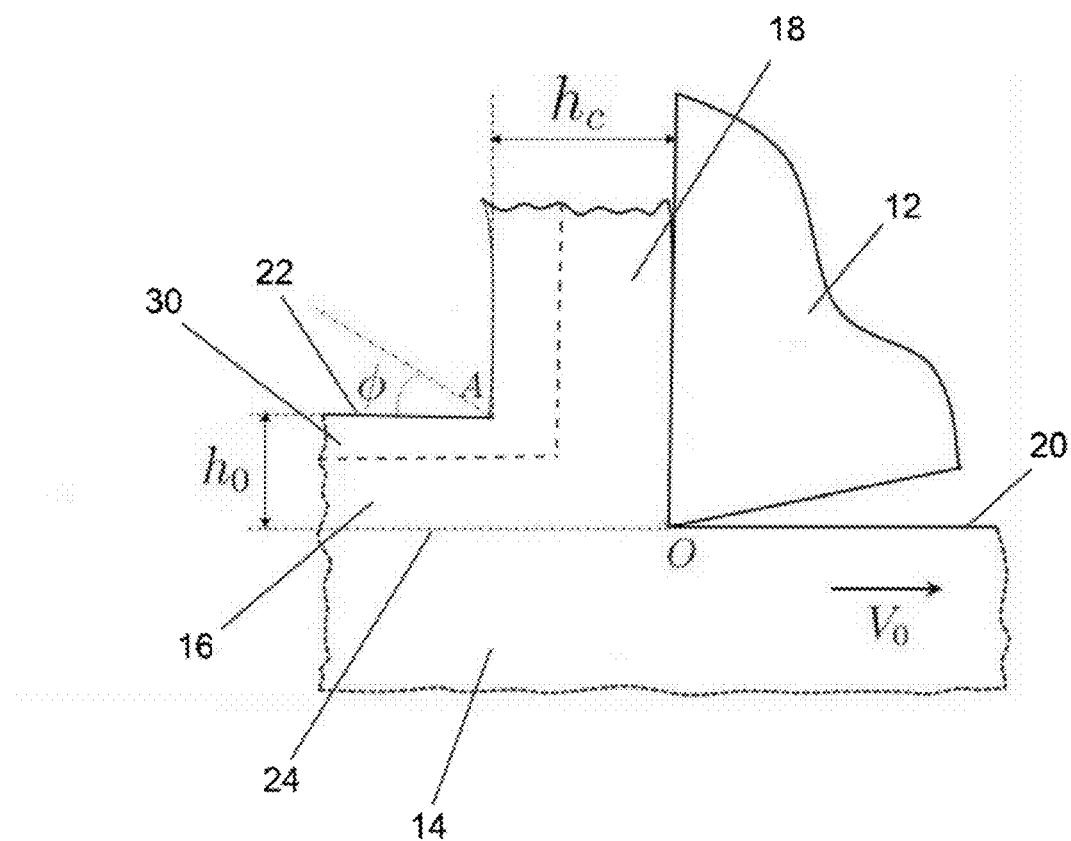
FIG. 12 is a schematic representation of a machining process being performed on a workpiece comprising a hardened layer thereon having an induced strain and capable of reducing sinuous flow during the machining process.

FIG. 12 schematically represents a first nonlimiting embodiment of the invention, in which a workpiece 14 formed of a soft and/or ductile metal or alloy may undergo a surface treatment in order to yield a pre-strained hardened layer 30 on the workpiece 14 prior to performing a machining operation on the workpiece 14. The hardened layer 30 is intended to modify the surface properties at the free surface 22 of the workpiece 14 such that the resulting chip 18 is formed by laminar flow, rather than sinuous flow. Preferably, the hardened layer 30 is treated to have a strain of equal to or greater than one. Such surface treatment causes refinement of the grain size and a reduction in the ductility of the metal or alloy at the free surface 22 thereof to remove triggers believed to effect sinuous flow, including bulge formation and the establishment of pinning points. The pre-straining may be accomplished by various surface deformation processes known in the art and which will not be discussed in any detail. Although the hardened layer 30 could have a thickness of greater than $h_0$, it preferably has a thickness of equal to or, as represented in FIG. 12, less than $h_0$ in order for the final surface 20 that remains after the cut to have the original properties of the workpiece 14 (soft or ductile), or in order for portions of the chip 18 to have the original properties of the workpiece 14, depending on which is the intended final product. Preferably, the hardened layer 30 has a minimum thickness sufficient to provide a surface hardness or ductility suitable for reducing or eliminating sinuous flow.

Figure 9:
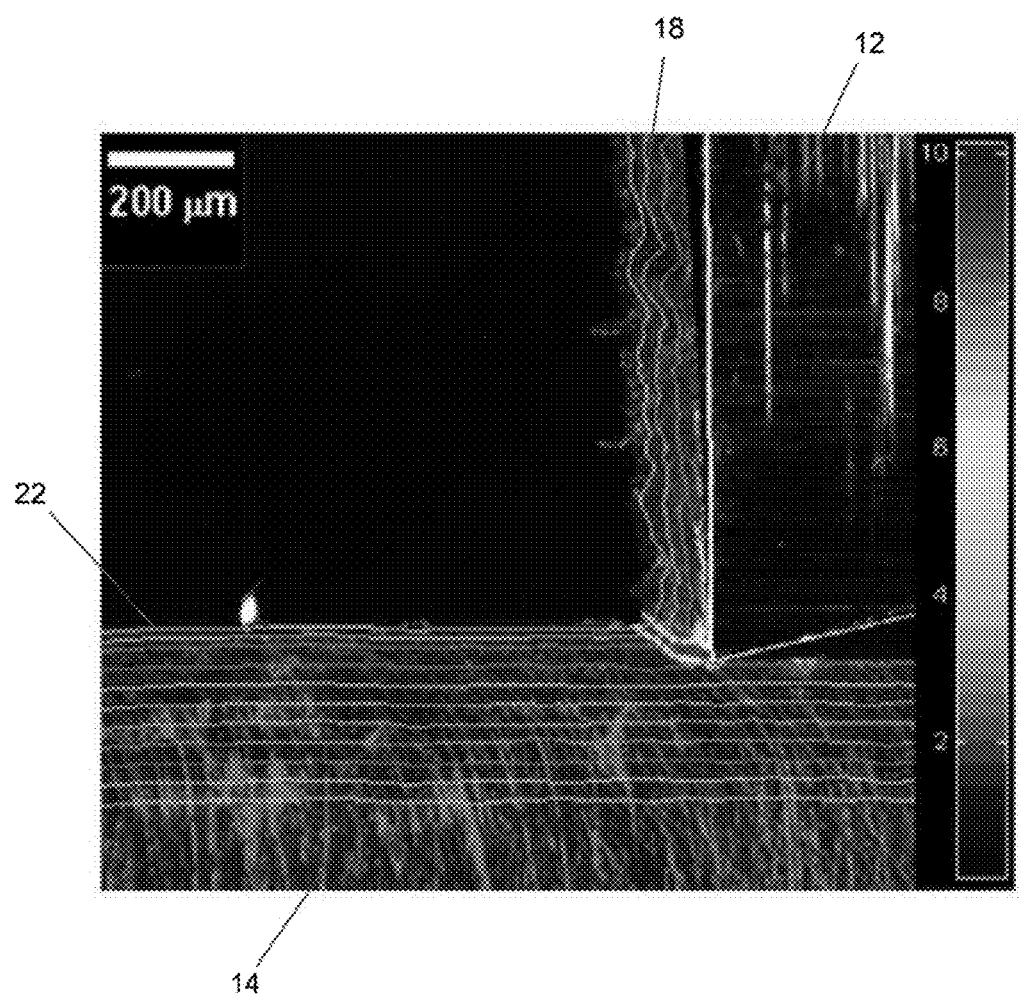
FIG. 9 in an image representing a strain rate field with superimposed streaklines when machining a surface-hardened copper workpiece. A sharply defined narrow shear zone is shown, as assumed in conventional plasticity models. The flow was laminar with insignificant bump formation ahead of the tool-chip interface.

FIG. 9 represents a machining operation that was performed on a hardened pre-strained copper workpiece 14. The image represents a strain rate field with superimposed streaklines during the machining operation. The workpiece 14 was machined at a velocity of $V_0$=0.42 mm/s, and the cutting depth was maintained at $h_0$=50 µm. The hardened layer 30 had a depth of equal to or less than 50 µm. As represented, the material adjacent the cutting tool 12 exhibited a sharply defined, narrow shear zone that produced a relatively thin chip 18 formed by laminar flow. No significant bump formation ahead of the tool-chip interface was observed and folding was prevented. The cutting force and strain required to cut the pre-strained copper workpiece 14 were both about 70% below that required to cut the same material without pre-straining. These results indicated that performing surface treatments to form a hardened layer 30 in an annealed metal prior to a machining operation can significantly reduce sinuous flow during the machining operation.

Figure 13:
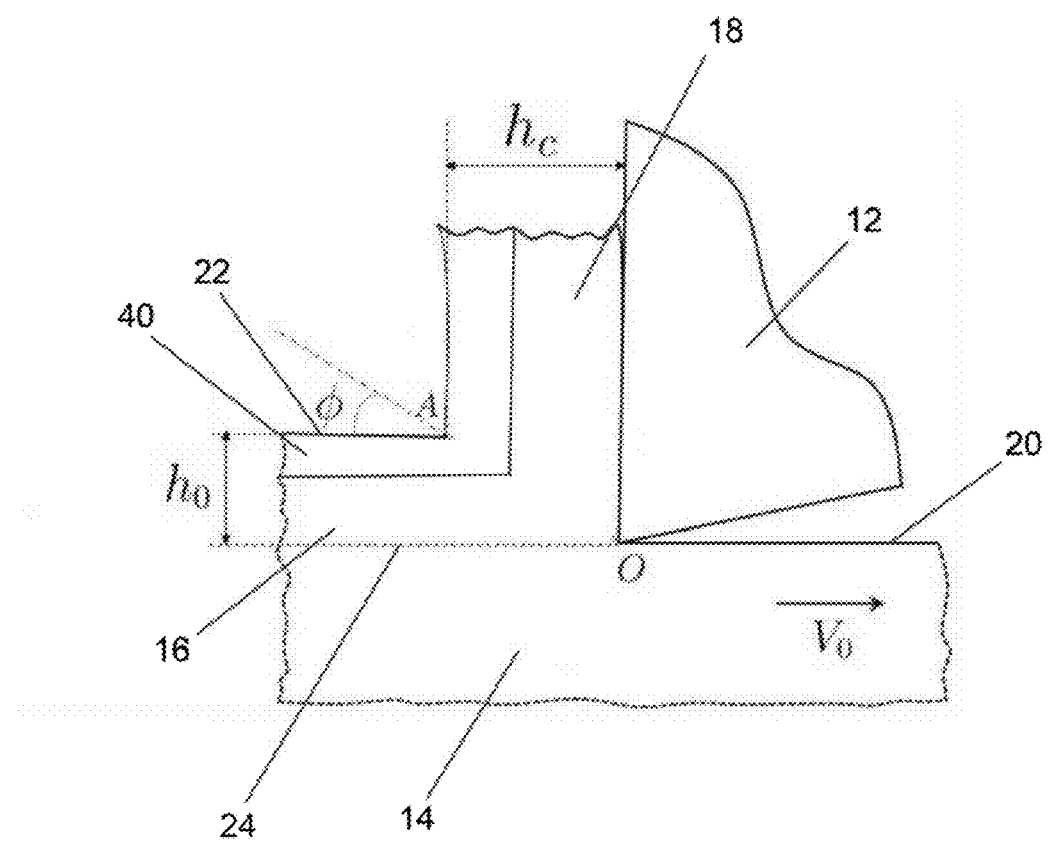
FIG. 13 is a schematic representation of a machining process being performed on a workpiece comprising a coating layer thereon capable of reducing sinuous flow during the machining process.

FIG. 13 schematically represents a second nonlimiting embodiment of the invention, in which a workpiece 14 formed of an annealed or otherwise relatively soft and/or ductile metal or alloy may undergo a coating process in order to provide a coating layer 40 on the workpiece 14 prior to performing a machining operation on the workpiece 14. The coating layer 40 is intended to modify the surface properties at the original free surface 22 of the workpiece 14 on which the coating layer 40 was deposited, such that the resulting chip 18 is formed by laminar flow, rather than sinuous flow. Preferably, the coating layer is either an amorphous material, or a crystalline material having a reduced average grain size and a lower ductility than the metal or alloy of the workpiece 14 to remove triggers believed to effect sinuous flow, including bulge formation and the establishment of pinning points. The coating layer 40 may be deposited by various known deposition methods, and therefore particular coating techniques and parameters will not be discussed in any detail. The coating layer 40 can be quite thin, even much smaller than the undeformed chip thickness. Although the coating layer 40 could have a thickness of greater than $h_0$, it preferably has a thickness of equal to or, as represented in FIG. 13, less than $h_0$ in order for the final surface 20 that remains after the cut to have the original properties of the workpiece 14 (soft or ductile), or in order for portions of the chip 18 to have the original properties of the workpiece 14, depending on which is the intended final product. Preferably, the coating layer 40 has a minimum thickness sufficient to provide a surface hardness or ductility suitable for reducing or eliminating sinuous flow. As a nonlimiting example, the coating layer 40 may have a depth of about 50 µm or less, or depending on the application, 10 µm or less. As represented, the coating layer 40 is above the material separation surface 24 and away from the tool-chip contact region.

Figure 10:
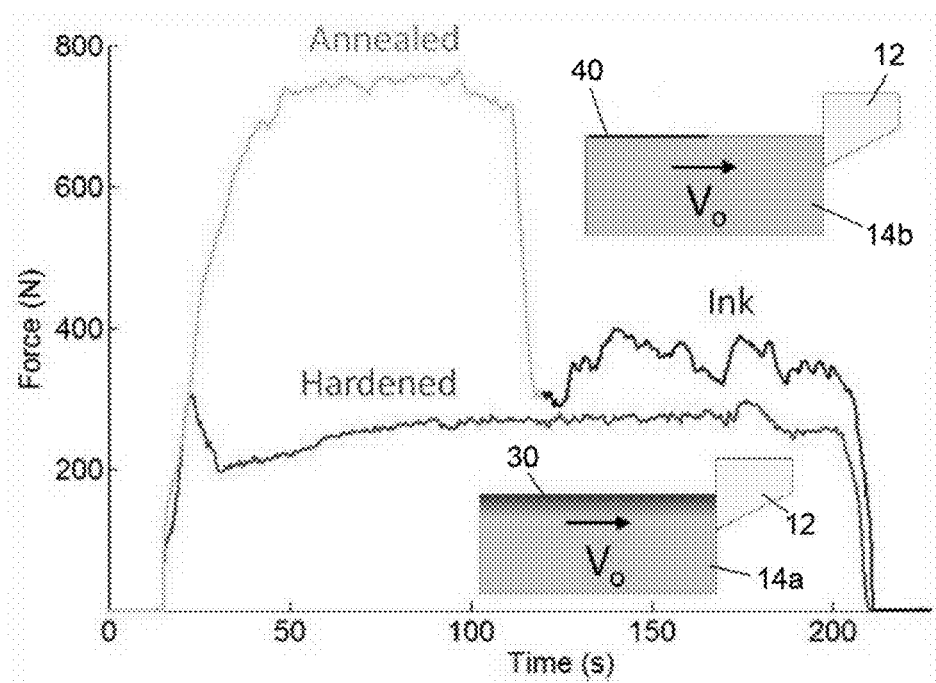
FIG. 10 is a graph representing a comparison of cutting forces for various surface conditions on copper workpieces, including a hardened surface, an annealed surface, and a coated annealed surface. The insets schematically represent machining operations performed to obtain the represented data.

FIG. 10 is a graph comparing cutting forces (force in the direction of $V_0$) for different surface conditions, including a hardened copper workpiece 14a processed to have a pre-strained hardened layer 40 (lower inset image), and an annealed copper workpiece 14b (upper inset image) having unmodified portions and portions with a coating layer 40 deposited thereon. Upper and lower insets schematically represent the machining operation performed on the annealed copper workpiece 14b and the hardened copper workpiece 14a, respectively. As represented, the annealed copper workpiece 14b was surface-coated over half its length with a coating layer 40, which was formed of a marking ink. The workpieces 14a and 14b were machined at a velocity of $V_0$=0.42 mm/s, and the cutting depth was maintained at $h_0$=50 µm. For the workpiece 14a, the hardened layer 30 had a depth of about 50 µm, and for the workpiece 14b, the coating layer 14b had a depth of about 10 µm.

When machining the annealed copper workpiece 14b, the cutting force in the unmodified region was very large and chip formation was via sinuous flow. Once the cutting tool 12 entered the coated region, a drastic reduction (greater than 50%) in the cutting force was observed and chip formation changed to laminar flow. This effect of the coating layer 40 was similar to that observed in the workpiece 14a due to the pre-strained hardened layer 30. The subsequent application of the coating layer 40 on the free surface 22 of the hardened copper workpiece 14a yielded no measurable effect on required cutting forces. These results indicated that depositing the coating layer 40 on an annealed metal workpiece prior to a machining operation can significantly reduce sinuous flow during the machining operation.

Various coating materials were tested on annealed workpieces, including inks, resins, paints, and lacquers which were found to suppress sinuous flow to various degrees. Such surface layer applications, however, did not have any noticeable influence on the forces and flow when cutting pre-strained workpieces, where the flow is intrinsically laminar. As such, suitable coating materials may include any material that is at least partly nonvolatile and capable of adequately adhering to the free surface of the workpiece, being applied as coating layer of desired thickness, and forming a coating layer having surface properties capable of suppressing the nucleation of unsteady flows, and occurrence of flow phenomena leading to folds in the chip, that is, sinuous flow. A particular example of a coating material is an ink commercially available under the brand name Dykem® owned by Illinois Tool Works which contains colored pigments in an alcohol (propanol+diacetone alcohol) medium.

The above embodiments provide suitable surface treatments and coatings that can suppress sinuous flow, thereby enabling improved processing of ductile metals, alloys, or other materials that would otherwise exhibit sinuous flow during machining operations. The large reduction in forces translates directly into an equivalent energy reduction. As such, the surface treatments and coatings described herein may be used as effective and simple methods for improving the machinability of materials such as, but not limited to, stainless steels, copper, aluminum, tantalum, and titanium and nickel alloys widely used in automotive, aerospace, biomedical, and energy applications. For example, the reduced cutting forces and energy dissipation may provide benefits for industrial machining, such as but not limited to, avoiding or reducing chatter-vibration instability across a broader range of process conditions, improving component surface quality, and enhancing tool life.

It is foreseeable that the surface treatments, coatings, and machining operations described above could be performed on separate machines and with the surface treatment or coating operation performed at any time prior to the machining operation, or in a single system in which the surface treatment or coating operation is performed immediately prior to the machining operation. For example, it is foreseeable that a system could, either continuously, in batches, or individually, provide a material (workpiece 14), induce a pre-strain in a surface of the material to provide a hardened layer 30 via a surface deformation process or apply and cure/dry a coating layer 40 on the surface of the material, and then perform a machining operation on the surface of the material, such as the machining process represented in FIGS. 1, 12, and 13. The scope of the invention includes the chips 18 formed by the embodiments described above. Such chips 18 may include the hardened layer 30 or the coating layer 40, whichever is used, and at least a second layer comprising the material of the workpiece 14. Depending on the application, it may be desirable to remove the hardened layer 30 (for example, by annealing) or the coating layer 40 after the machining operation has completed.

It should be noted that while references have been made in this disclosure to improvements to the machinability of annealed metals and/or alloys, the concepts of this disclosure are also applicable to various non-annealed ductile metals and/or alloys, as well metals and alloys in a partially hardened state, that is, partially annealed. In addition, it is foreseeable and within the scope of the invention that various non-metal materials may be used with the above noted embodiments, including applying the coating layer 40 on certain polymers that would otherwise exhibit sinuous flow during a machining operation. As used herein, the term metal encompasses metals, alloys, and metallic materials.

While the invention has been described in terms of specific embodiments, it is apparent that other forms could be adopted by one skilled in the art. For example, the physical configuration of the workpiece 14 and cutting tool 12 could differ from that shown, and materials and processes/methods other than those noted could be used. Therefore, the scope of the invention is to be limited only by the following claims.

The invention claimed is:

1. A method of machining a body to controllably produce a chip, wherein the body is formed of a material and in a state such that the material exhibits sinuous flow during a machining operation, the method comprising:
providing a layer located on a surface of the body; and
machining the body to remove a surface portion of the body having the layer thereon by causing engagement between a cutting tool and the body in a contact region below the surface of the body having a portion of the layer thereon and moving the cutting tool relative to the body to remove the surface portion of the body and the portion of the layer thereon, produce a final surface of the body, and produce the chip having the portion of the layer thereon;
wherein the layer reduces sinuous flow in the material of the body.

2. A method of machining a body to controllably produce a chip, wherein the body is formed of a material and in a state such that the material exhibits sinuous flow during a machining operation, the method comprising:
providing a layer located on a surface of the body, wherein the layer is provided by performing a surface deformation process to induce a strain in the surface of the body and form a hardened layer; and
machining the body by causing engagement between a cutting tool and the body in a contact region below an area of the surface having the layer thereon and moving the cutting tool relative to the body to produce the chip having the layer thereon;
wherein the layer reduces sinuous flow in the material of the body.

3. The method of claim 2, wherein the layer is provided to have a strain of greater than or equal to one.

4. The method of claim 1, wherein the layer is provided by performing a deposition process to adhere a coating material on the surface of the body and form the layer as a coating layer thereon.

5. The method of claim 4, wherein the coating material is an ink, a resin, a paint, or a lacquer or comprises an alcohol.

6. The method of claim 1, wherein the layer is provided to have a ductility that is lower than the surface, and an average grain size that is smaller than the surface.

7. The method of claim 1, wherein the material of the body comprises an annealed metal, alloy, or metallic material.

8. The method of claim 1, wherein the material of the body comprises a polymer.

9. The method of claim 1, further comprising removing the layer from the chip after the body has been machined to produce the chip.

10. The chip produced by the method of claim 2, the chip comprising the hardened layer and at least a second layer comprising the material of the body.

11. The chip produced by the method of claim 4, the chip comprising the coating material and at least a second layer comprising the material of the body.

12. The method of claim 1, wherein the material of the body is chosen from the group consisting of stainless steels, copper, aluminum, tantalum, titanium, and nickel alloys.

13. The method of claim 4, wherein the coating material adheres to the surface of the body.

14. The method of claim 4, wherein the layer has a lower ductility than the body.

15. The method of claim 4, wherein the coating material is an ink and the material of the body is annealed copper.

16. The method of claim 4, wherein the coating material comprises an alcohol and the material of the body is a stainless steel, copper, aluminum, tantalum, titanium, or nickel alloy.

17. The method of claim 1, wherein the chip is formed primarily by laminar flow.

\* \* \* \* \*